(12) United States Patent
Troeger et al.

(10) Patent No.: US 6,241,305 B1
(45) Date of Patent: Jun. 5, 2001

(54) REMOVABLE RETAINER ARRANGEMENTS FOR FLEXIBLE, VEHICLE TOPS

(75) Inventors: Rick H. Troeger, Westminster; Richard C. Essig, Berthoud, both of CO (US)

(73) Assignee: Bestop, Inc., Broomfield, CO (US)

( * ) Notice: Subject to any disclaimer, the term of this patent is extended or adjusted under 35 U.S.C. 154(b) by 0 days.

(21) Appl. No.: 09/478,669

(22) Filed: Jan. 6, 2000

Related U.S. Application Data

(63) Continuation-in-part of application No. 09/436,927, filed on Nov. 8, 1999, which is a continuation of application No. 09/052,740, filed on Mar. 31, 1998, now Pat. No. 5,979,968, which is a division of application No. 08/646,486, filed on May 8, 1996, now Pat. No. 5,765,903.

(51) Int. Cl.$^7$ ........................................... B60J 7/12
(52) U.S. Cl. ..................... 296/102; 219/121; 160/327
(58) Field of Search ..................... 296/102, 100.16, 296/107.05, 135, 121, 219, 136; 160/327, 397

(56) References Cited

U.S. PATENT DOCUMENTS

| | | |
|---|---|---|
| 654,993 | 7/1900 | Martin . |
| 1,294,879 | 2/1919 | Davis . |
| 1,367,928 | 2/1921 | Stolp . |
| 1,538,759 | 5/1925 | Thomas . |
| 1,601,443 | 9/1926 | Haver . |
| 1,894,527 | 1/1933 | Yengst . |
| 2,020,451 | 11/1935 | Atwell .................................. 296/51 |
| 2,325,500 | 7/1943 | Fosberg ................................ 160/383 |
| 2,352,609 | 7/1944 | Bates .................................... 160/267 |
| 2,460,399 | 2/1949 | Schassberger ........................ 296/44 |
| 2,463,646 | 3/1949 | Schassberger ...................... 296/104 |
| 2,537,611 | 1/1951 | Walton ................................ 160/268 |
| 2,610,086 | 9/1952 | Shield .................................. 296/105 |
| 2,711,342 | 6/1955 | Selzer .................................... 296/32 |
| 2,936,195 | 5/1960 | Schutte ................................. 296/106 |
| 3,053,566 | 9/1962 | Allen ..................................... 296/106 |
| 3,160,436 | 12/1964 | Duddleston ........................ 296/105 |

(List continued on next page.)

FOREIGN PATENT DOCUMENTS

| | | | |
|---|---|---|---|
| 1132168 | 9/1982 | (CA) . | |
| 464490 | * 12/1968 | (CH) ..................................... 52/222 |
| 835845 | * 2/1952 | (DE) ................................... 296/219 |
| 28378 | 9/1959 | (DE) . | |
| 2306749 | 8/1973 | (DE) ..................................... 52/222 |
| 2264596 | 7/1974 | (DE) ..................................... 52/222 |
| 3136897 | 3/1983 | (DE) . | |
| 3200083 | 7/1983 | (DE) . | |
| 43466 | 1/1982 | (EP) ..................................... 52/222 |
| 569039 | 11/1993 | (EP) ................................... 296/100 |
| 1214421 | 12/1970 | (GB) ..................................... 52/222 |
| 1421984 | 1/1976 | (GB) . | |
| 2198396 | 6/1988 | (GB) ................................... 296/100 |
| 371554 | * 2/1952 | (IT) .................................... 296/219 |
| 6255373 | 9/1994 | (JP) .................................... 296/100 |
| 6255374 | 9/1994 | (JP) .................................... 296/100 |
| 884624 | 11/1981 | (SU) ..................................... 52/222 |
| 992249 | 2/1983 | (SU) ................................... 296/100 |

OTHER PUBLICATIONS

Figures 1–11 of the related application U.S. application No. 08/437,322 filed May 9, 1995.

* cited by examiner

*Primary Examiner*—Dennis H. Pedder
(74) *Attorney, Agent, or Firm*—W. Scott Carson

(57) ABSTRACT

Retainer arrangements for removably attaching flexible tops to sport utility, convertible, and other vehicles. The arrangements include a belt or flange which is sewn or otherwise attached to the flexible top and a U-shaped channel member which is formed on the vehicle body. In the preferred embodiments, the belt or flange is received in the U-shaped channel member and a mating protuberance and recess arrangement is provided to removably lock the flange in the channel member.

13 Claims, 11 Drawing Sheets

U.S. PATENT DOCUMENTS

| | | | |
|---|---|---|---|
| 3,167,349 | 1/1965 | Young et al. | 296/137 |
| 3,177,501 * | 4/1965 | Kwake | 4/172 |
| 3,186,712 * | 6/1965 | Kessler | 160/392 X |
| 3,201,171 | 8/1965 | Wickard | 296/100 |
| 3,211,492 | 10/1965 | Wozena et al. | 296/44 |
| 3,354,473 | 11/1967 | Schwarz | 160/395 |
| 3,373,464 | 3/1968 | Ausnit | 24/201 |
| 3,391,724 | 7/1968 | Charlesworth | 160/368 |
| 3,405,489 | 10/1968 | Frisk . | |
| 3,406,483 | 10/1968 | Mitchell | 49/192 |
| 3,606,448 | 9/1971 | Walker | 296/105 |
| 3,719,013 | 3/1973 | Blick . | |
| 3,765,717 | 10/1973 | Garvert . | |
| 3,768,540 | 10/1973 | McSwain | 160/23 |
| 3,774,959 | 11/1973 | Brudy | 296/121 |
| 3,958,826 | 5/1976 | Upton | 296/78 |
| 4,036,521 | 7/1977 | Clenet . | |
| 4,061,394 | 12/1977 | Vodin . | |
| 4,093,302 | 6/1978 | Adams . | |
| 4,179,152 | 12/1979 | Kent, Jr. | 296/196 |
| 4,188,764 | 2/1980 | Gode | 52/582 |
| 4,233,765 | 11/1980 | O'Mullan et al. . | |
| 4,272,119 | 6/1981 | Adams . | |
| 4,285,539 | 8/1981 | Cole | 296/105 |
| 4,289,346 | 9/1981 | Bourgeois | 296/105 |
| 4,505,512 | 3/1985 | Schmeichel et al. . | |
| 4,600,235 | 7/1986 | Frederick et al. | 296/106 |
| 4,639,033 | 1/1987 | Wheatley et al. . | |
| 4,647,103 | 3/1987 | Walblay . | |
| 4,757,854 | 7/1988 | Rippberger | 160/391 |
| 4,792,179 | 12/1988 | Stevens | 296/100 |
| 4,807,921 | 2/1989 | Champie, III et al. | 296/98 |
| 5,029,422 * | 7/1991 | Scherrer | 160/392 |
| 5,033,787 | 7/1991 | Takada | 296/102 |
| 5,058,652 | 10/1991 | Wheatley et al. | 160/327 |
| 5,230,377 * | 7/1993 | Berman | 52/222 X |
| 5,301,447 | 4/1994 | Lotter et al. . | |
| 5,367,977 | 11/1994 | Ellis et al. . | |
| 5,385,377 | 1/1995 | Girard | 296/36 |
| 5,398,388 | 3/1995 | Coleman . | |
| 5,467,546 | 11/1995 | Kovalak, Jr. . | |
| 5,517,779 | 5/1996 | Coleman | 40/603 |
| 5,540,476 * | 7/1996 | Cowsert | 296/107.07 X |

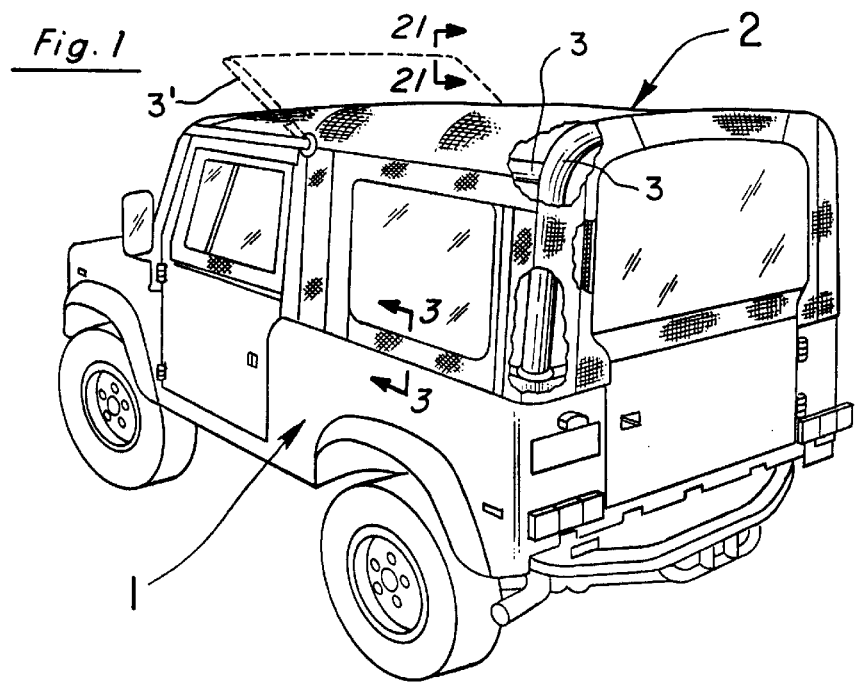
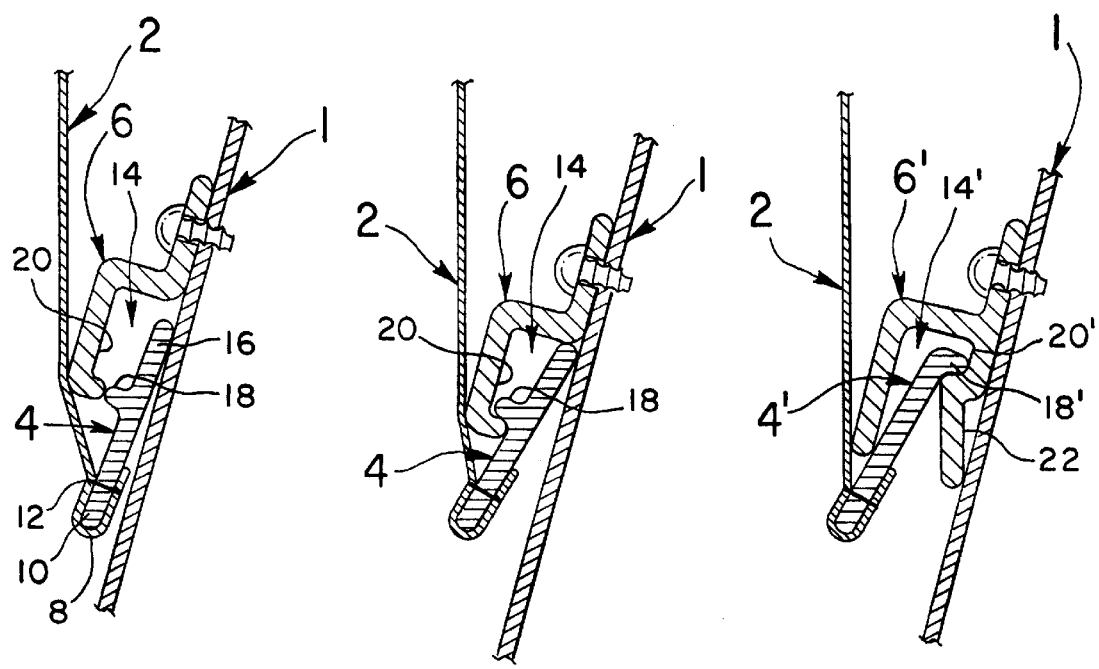
Fig. 2     Fig. 3     Fig. 4

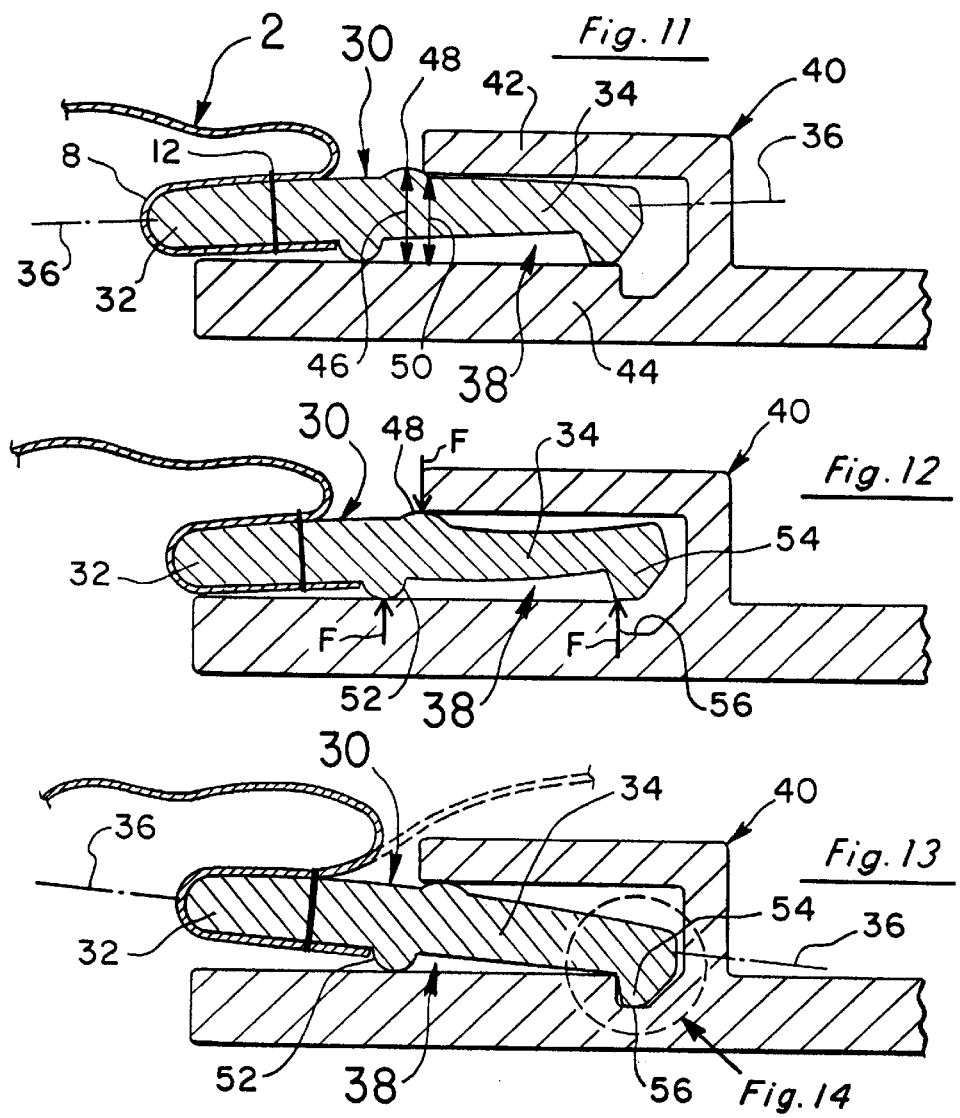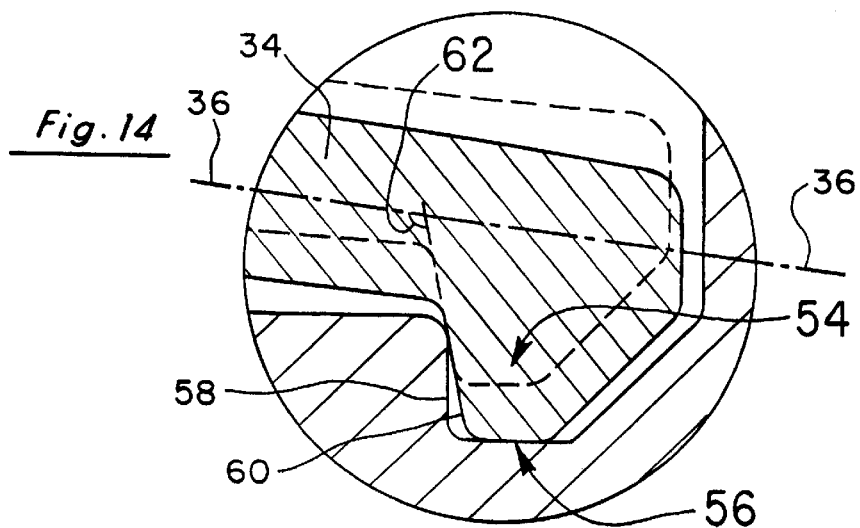

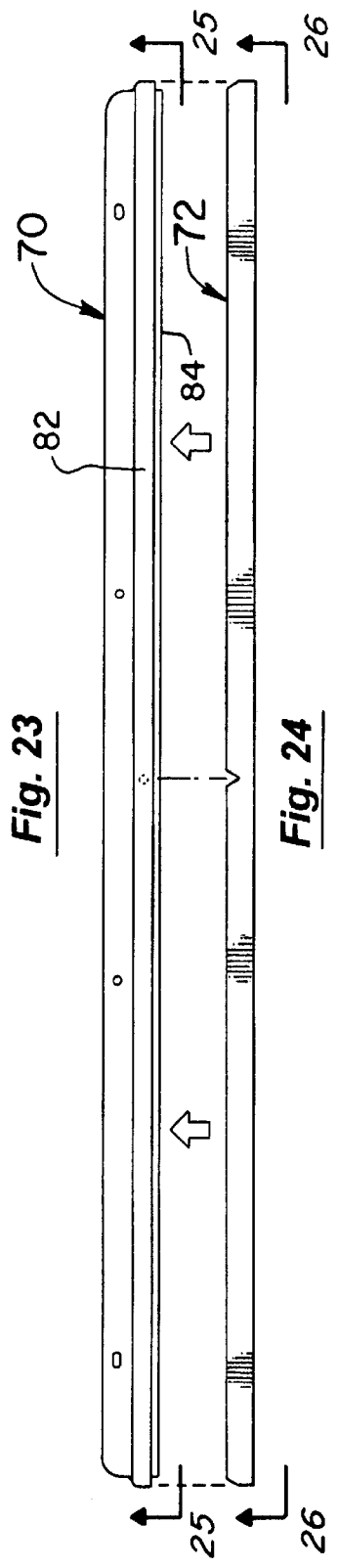
*Fig. 23*
*Fig. 24*
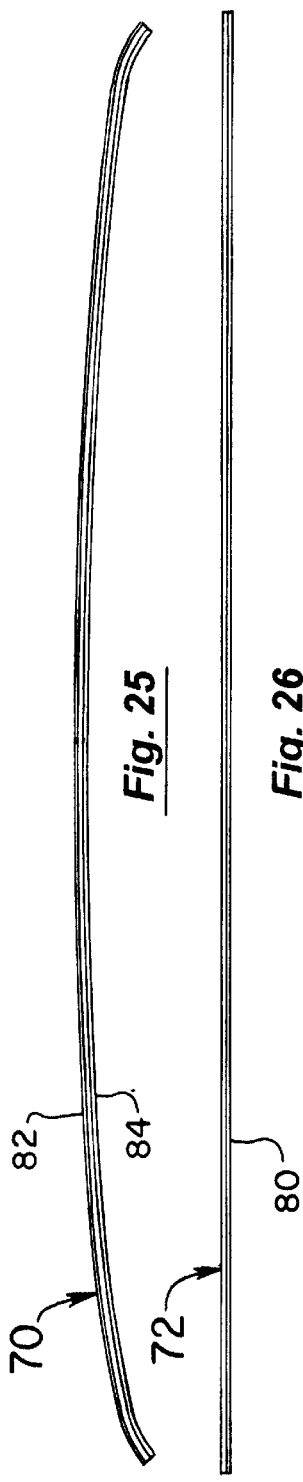
*Fig. 25*
*Fig. 26*
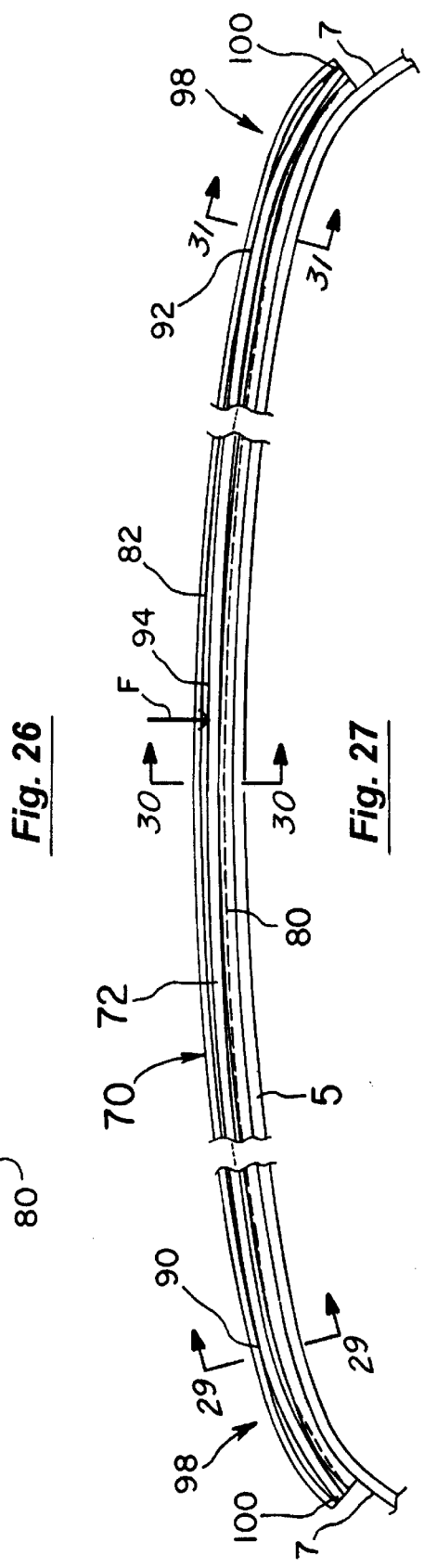
*Fig. 27*

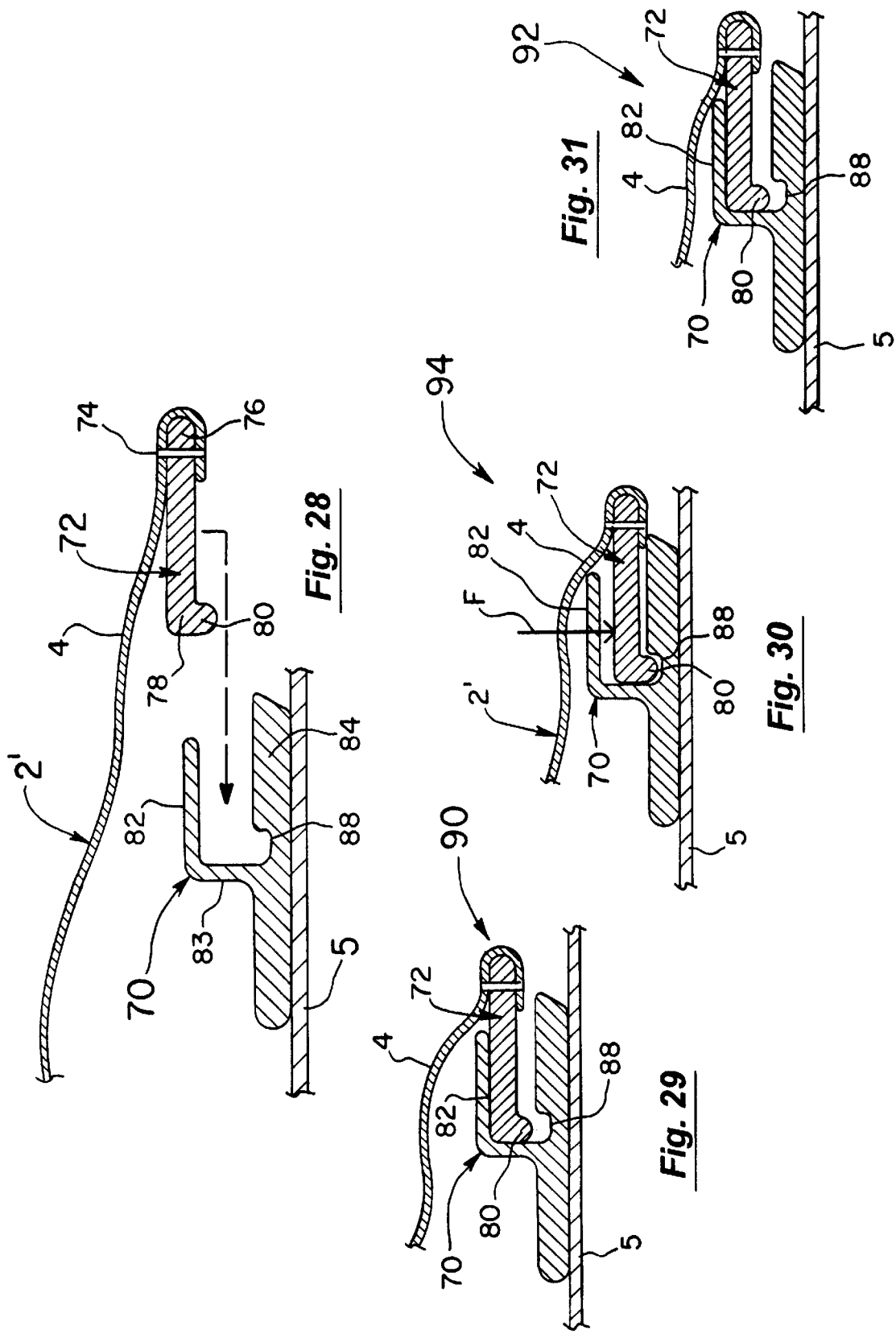

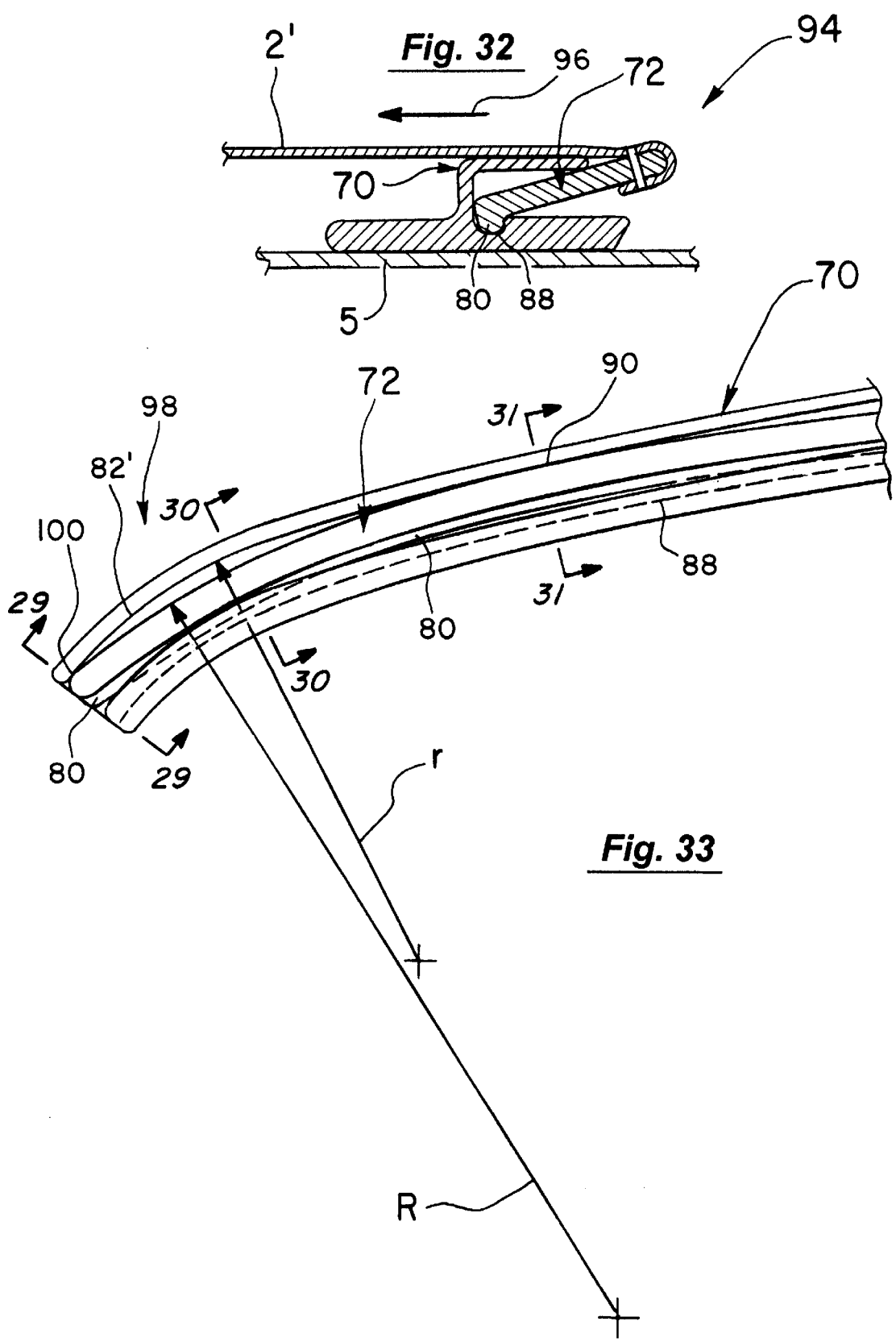

REMOVABLE RETAINER ARRANGEMENTS FOR FLEXIBLE, VEHICLE TOPS

RELATED APPLICATION

This application is a continuation-in-part of U.S. patent application Ser. No. 09/436,927 filed Nov. 8, 1999, which is a continuation of U.S. patent application Ser. No. 09/052,740 filed Mar. 31, 1998, now U.S. Pat. No. 5,979,968, which is a division of U.S. patent application Ser. No. 08/646,486 filed May 8, 1996, now U.S. Pat. No. 5,765,903.

BACKGROUND OF THE INVENTION

1. Field of the Invention

This invention relates to the field of retainer arrangements for removably attaching flexible tops to vehicle bodies.

2. Discussion of the Background

Providing effective retainer arrangements for attaching tops to vehicle bodies has always presented challenging design problems. These problems are particularly prevalent in sport utility, convertible, and other vehicles which have flexible tops of fabric-like material such as canvas or vinyl which are removable for an open air feeling or service. Co-owned U.S. Pat. No. 4,757,854 taught a very effective approach to accomplish this in which a belt or flange was attached to the edge of the flexible, fabric top and inserted into a U-shaped channel mounted on the vehicle body. In doing so, the flexible top was first pulled taut and stretched a half inch or so. This placed the resilient top under a slight tension as the belt was manually manipulated into the channel; and, the resulting tension was then used to maintain the belt with the attached top in the channel. The present invention is an improvement over this basic design.

SUMMARY OF THE INVENTION

This invention involves retainer arrangements for removably attaching flexible tops to sport utility, convertible, and other vehicles. The arrangements include a belt or flange which is sewn or otherwise attached to the flexible top and a U-shaped channel which is formed on the vehicle body. In the preferred embodiments, the belt or flange is received in the U-shaped channel and a mating protuberance and recess arrangement is provided to removably lock the flange in the channel.

In one approach, the flange with the flexible top attached to it is manually manipulated to slide into the U-shaped channel. In doing so, the flexible top is stretched slightly and placed under tension. Upon releasing the inserted flange, the resilient force of the stretched top causes the flange to rotate or cock relative to the U-shaped channel which then firmly mates the protuberance and recess of the locking arrangement. In a second approach, an initial interference fit is provided between the flange and U-shaped channel. The flange is then moved relative to the channel past the interference fit and rotated as in the first approach under the residual force of the stretched top to firmly mate the protuberance and recess in their locked position. However, unlike the first approach, the flange and channel will thereafter remain engaged because of the interference fit regardless of whether there is any residual force or tension applied to the flange by the flexible top In a third approach, the flange and channel are also designed to remain attached to one another regardless of whether there is any residual tension applied to the flange by the flexible top. However, unlike the second approach, the flange and channel do not rely on any residual force in the top to assume their locked position. In a fourth approach, the flange can be slid into the channel member in a non-interference manner. However, because the channel member is curved along its length, the flange and channel member are self-locking, independent of any tension being applied by the flexible top. In all embodiments, the insertion process of the flange into the channel can be reversed when desired to remove the flange and attached top from the U-shaped channel and vehicle body.

BRIEF DESCRIPTION OF THE DRAWINGS

FIG. 1 is a rear perspective view of a vehicle employing one of the retainer arrangements of the present invention. The flexible top in FIG. 1 is also partially broken away to show the underlying bow structure on which the top is supported.

FIG. 2 is a cross-sectional view of one of the retaining arrangements of the invention showing the positioning of the belt or flange as it is being initially inserted into the U-shaped channel mounted on the vehicle body.

FIG. 3 is a cross-sectional view taken along line 3—3 of FIG. 1 illustrating the fully inserted flange of FIG. 2 and how it is held in place in its locked position by the tensioned top.

FIG. 4 is a view similar to FIG. 3 of a modification to the retaining arrangement of FIGS. 2 and 3.

However, like the approach of FIGS. 2–4, residual tension in the top is still relied on to rotate the flange into its locked position.

FIGS. 11–21 illustrate a third approach to retaining the flange in the U-shaped channel. In this third approach, the flange and channel do not rely on any residual force in the top to assume their locked position. Additionally, the flange and channel remain attached to one another in their locked position regardless of whether there is any residual tension applied to the flange by the flexible top. In the sequence drawings of FIGS. 11–14, an embodiment is illustrated in which the channel is made of relatively rigid material and the flange flexes. In the sequence drawings of FIGS. 15–17, the flange is made of relatively rigid material and the U-shaped channel member flexes. In the sequence drawings of FIGS. 18–21, the flange and channel are both made of resilient material and flex.

Figure 22:
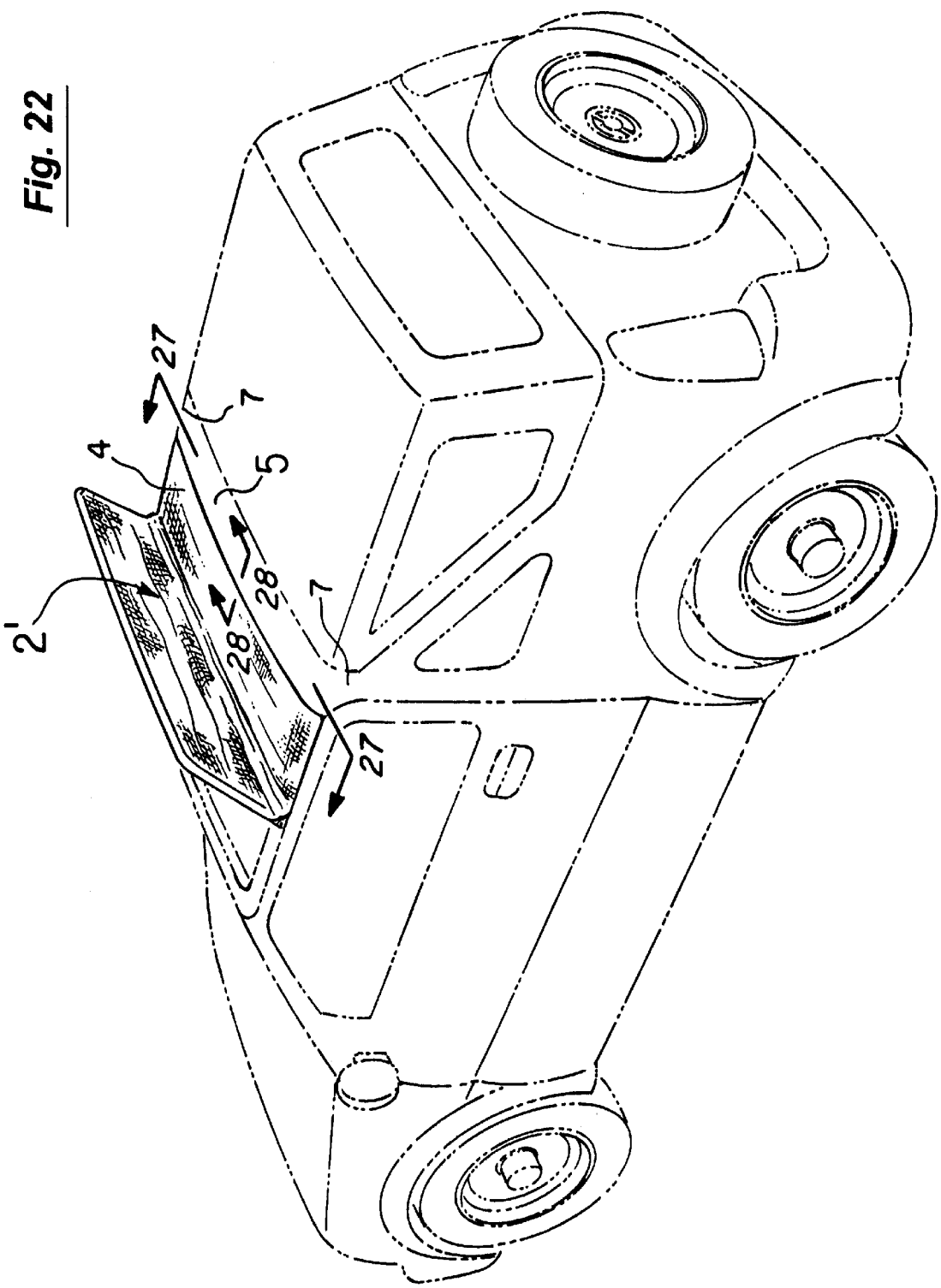

FIGS. 22–34 illustrate a fourth approach to retaining the flange in the channel member. In FIG. 22, this fourth approach is shown in use to attach the rear of the flexible top or sunroof to the vehicle roof portion extending between the B-pillars of the vehicle.

FIG. 23 is a top plan view of the channel member of the fourth approach.

FIG. 24 is a top plan view of the flange of the fourth approach.

FIG. 25 is a view taken along line 25—25 of FIG. 23.

FIG. 26 is a view taken along line 26—26 of FIG. 24.

FIG. 27 is a view taken along line 27—27 of FIG. 22.

FIG. 28 is a cross-sectional view of the flange and channel member taken generally along line 28—28 of FIG. 22. .

FIGS. 29–31 are cross-sectional views taken respectively along lines 29—29, 30—30, and 31—31 of FIG. 27.

FIG. 32 is a view of the engaged flange and channel member as pivoted under the force of the tensioned top.

FIG. 33 is an enlarged view of the end section of the channel member and the engaged flange.

Figure 34:
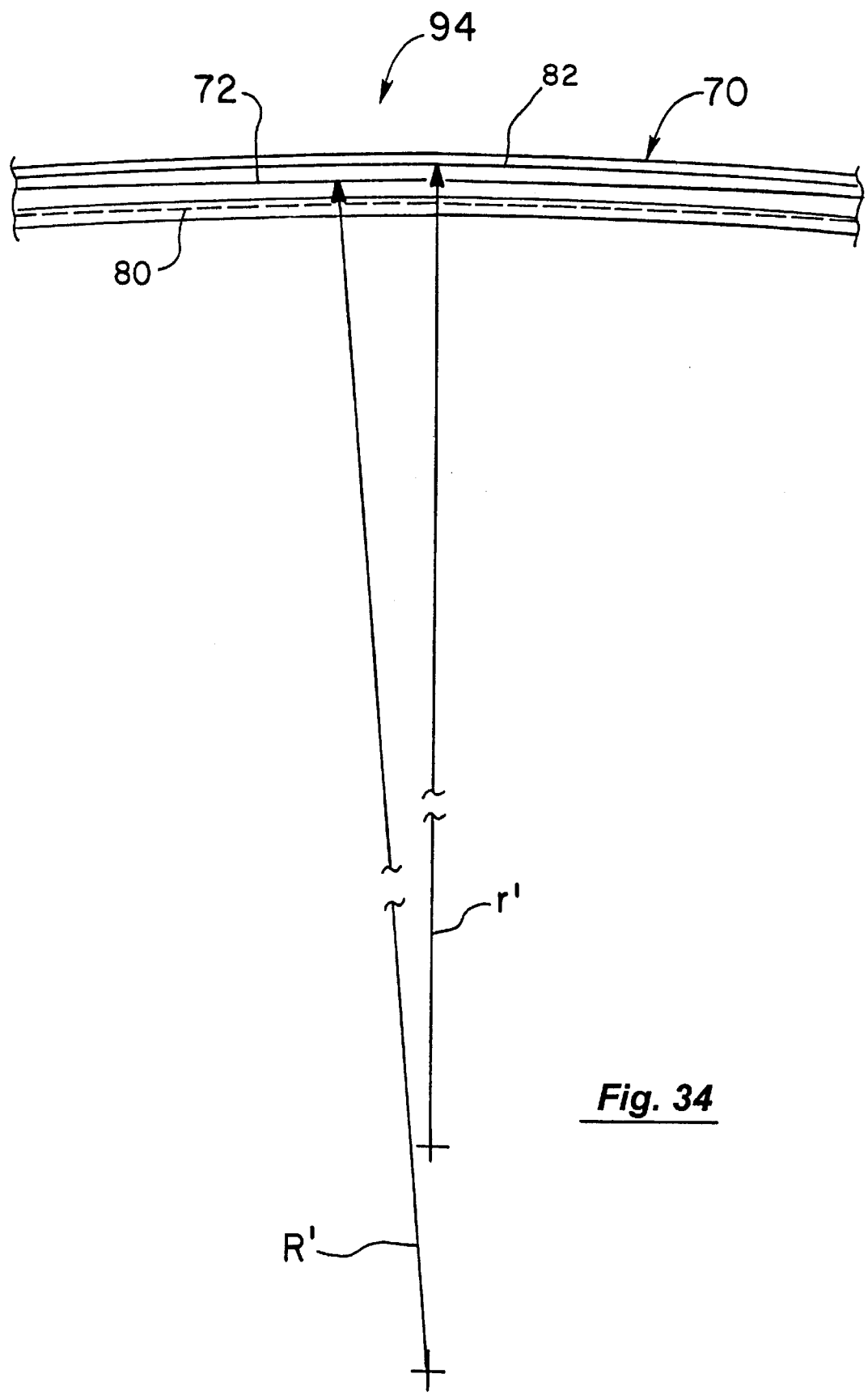

FIG. 34 is an enlarged view of the middle of the channel member and engaged flange.

DETAILED DESCRIPTION OF THE PREFERRED EMBODIMENTS

FIG. 1 illustrates the top retaining system of the present invention in use on a sport utility vehicle 1. The top 2 as illustrated is partially broken away in the rear to show the underlying bow structure 3 on which the flexible top 2 is supported. The top 2 itself is made of canvas, vinyl, or similar fabric-like material and is slightly stretchable and resilient. In use, the flexible top 2 can be draped over the bows 3 or other support frame of the vehicle 1 and pulled taut to stretch a half inch or so. This places the top 2 under a slight tension and the resulting force of such tension is used in the first approach of FIGS. 2–4 to hold the top 2 on the vehicle body 1. In the embodiment of FIGS. 2–3, this is done by the retaining arrangement of belt 4 and channel member 6. Similarly, in the embodiment of FIG. 4, this retaining is accomplished by the modified belt 4' and channel member 6'.

First Approach of FIGS. 2–4

Referring initially to the embodiment of FIGS. 2–3, the flexible top 2 can be attached to the retaining belt or flange 4 in any number of ways. As shown in FIG. 2, this can be done by simply wrapping the end or edge portion 8 of the top 2 about the first end portion 10 of the flange 4 and sewing a line at 12 through the fabric top 2 and flange 4. A U-shaped channel 14 is then formed by mounting channel member 6 to the side of the vehicle 1. In operation as illustrated in FIG. 2, the second end portion 16 of the flattened or elongated flange 4 is initially inserted into the U-shaped channel 14 formed by channel member 6. This manual manipulation of the flange 4 stretches and pulls the flexible top 2 taut placing it under tension. As the flange 4 is fully inserted into the U-shaped channel 14 and released (see FIG. 3), the residual tension or force of the stretched, resilient top 2 causes the flange 4 to rotate or cock relative to the channel forming member 6. This rotation firmly engages the mating protuberance 18 and recess 20 to positively lock the flange 4 in the U-shaped channel 14 under the residual tension of the top 2. As shown, the second end portion 16 of the flange 4 in this position is fully received in the U-shaped channel 14 while the axially spaced first end portion 10 remains substantially outside the U-shaped channel 14. In a variation of this first embodiment as shown in FIG. 4, the recess 20' is adjacent the vehicle body 1 in a leg 22 of the channel forming member 6'. The protuberance 18' extending outwardly on the flange 4' then locks into the mating recess 20' to retain the top 2 on the vehicle body 1.

As illustrated, both of the embodiments of FIGS. 2–4 rely on the residual tension in the top 2 to hold the flanges 4 and 4' in the locked positions of FIGS. 3 and 4. Further, both embodiments of FIGS. 2–4 rely on there being some residual tension in the flexible top 2 to keep the flanges 4 and 4' engaged in channel members 6 and 6'. That is, the legs of the U-shaped channel are spaced a first distance apart that is greater than the thickness of the flange. Consequently, for example, if the top 2 in FIGS. 2–4 were to lose all or even some of its residual tension, it is possible that the flanges 4 and 4' may disengage and move completely out of their retaining channel members 6 and 6'.

Second Approach of FIGS. 5–10

Figure 10:
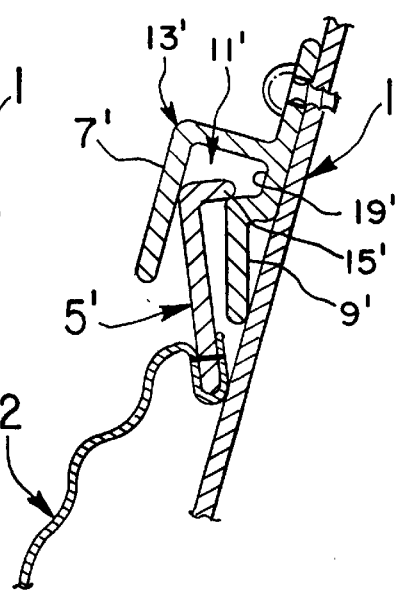

In contrast the first approach of FIGS. 3 and 4 which relies on the residual tension of the top 2 to always hold or maintain the flanges 4 and 4' engaged in the channel members 6 and 6', the embodiments of the second approach of FIGS. 5–10 provide an interference fit to do so. That is and referring to the embodiment of FIGS. 5–9, there is an interference fit between the flange 5 and legs 7 and 9 of the U-shaped channel 11. This U-shaped channel 11 as shown is formed by mounting the channel member 13 to the vehicle body 1. In this embodiment, the interference fit is between the protuberance 15 extending outwardly on the flange 5 and the portion 17 on the leg 7. The portion 17 as shown defines in part the inwardly extending recess 19. In operation as the second end portion 21 of the flange 5 is initially received and inserted into the U-shaped channel 11 to the first position of FIG. 5, the protuberance 15 and leg 7 will thus abut. This will occur because the thickness of the flange 5 at this point is greater than the spacing between the legs 7 and 9 of the U-shaped channel 11. Consequently, as the flange 5 is inserted farther into the channel 11, either or both (see FIG. 6) of the flange 5 and the channel member 13 must resiliently flex in order for the abutting portions 15 and 17 to pass one another. The vehicle body 1 in this embodiment forms one of the legs (i.e., leg 9) of the U-shape. This leg 9 and the corresponding legs like 9' in FIG. 10 are essentially held in a fixed position and preferably do not flex. Nevertheless, the necessary flexing could be in almost any of the other portions or members including in the entire flange 5 or just the protuberance 15 on it. It could also additionally be in the base 23 of the U-shape and/or in the leg 7 (or just in the protruding portion 17 of leg 7). Regardless of which portions or members flex, the flange 5 can be manually maneuvered to the second position of FIG. 7.

Figure 6:
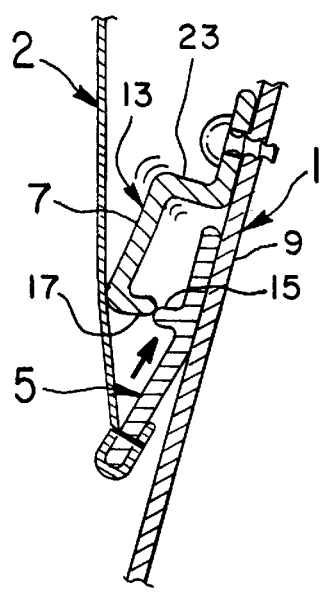
Figure 7:
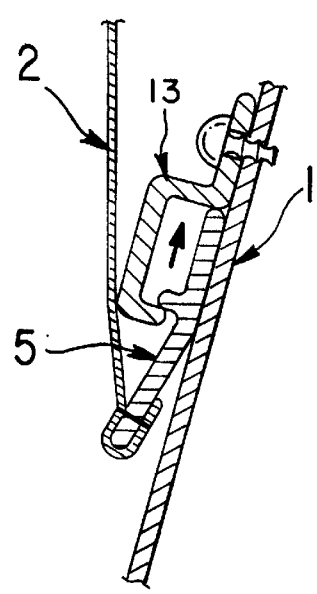
Figure 8:
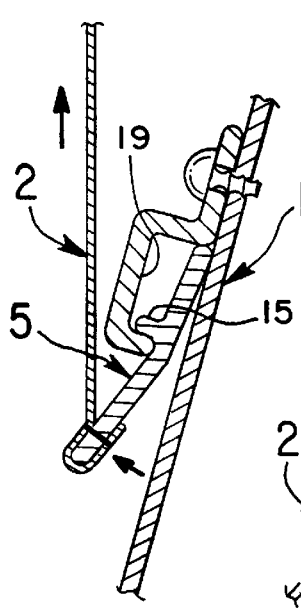
Figure 9:
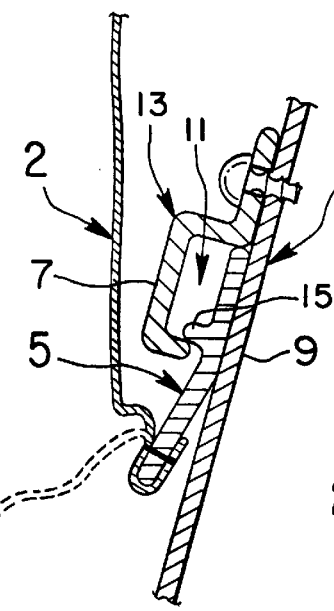

Thereafter and like the first approach of FIGS. 2–4, the residual tension in the top 2 will then rotate or cock the flange 5 from the engaging, second position of FIG. 7 to the locked, third position of FIG. 8 in which the protuberance 15 is fully mated in the recess 19. However, unlike the first approach of FIGS. 2–4, the interference retaining arrangement of FIGS. 5–9 will maintain the flange 5 engaged in the channel 11 even when there is no residual tension on the flexible top 2 (see FIG. 9). The interference retaining arrangement of FIGS. 5–9 as compared to the arrangements of FIGS. 2–4 is thus not dependent on any residual tension in the flexible top 2 to remain engaged.

Figure 5:
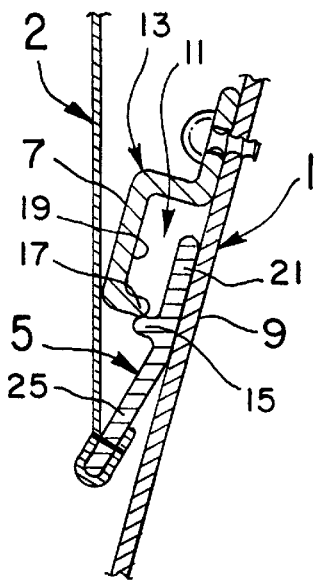
FIGS. 5–10 illustrate a second approach to retaining the flange in the U-shaped channel. In this second approach, an interference fit is provided between the flange and channel. In contrast to the first approach of FIGS. 2–4, the flange and channel of FIGS. 5–10 will remain engaged regardless of whether there is any residual tension applied to the flange by the flexible top.

In many applications, this can be an important feature. For example, it is not uncommon for the top 2 to be exposed to high temperatures and lose its residual tension as shown in solid lines in FIG. 9. This may also simply occur with age. Regardless of how this residual tension is lost (e.g., heat, age, or even if the top 2 is partially removed to the position shown in dotted lines in FIG. 9), the interference fit between the protuberance 15 and the legs 7 and 9 of channel 11 in FIG. 9 will hold the flange 5 and attached top 2 engaged in the channel 11 until the manual insertion steps of FIGS. 5 and 6 are reversed. Consequently, the flange 5 will not inadvertently separate from the channel 11 should the top 2 become heated or otherwise loosen to the position shown in solid or dotted lines in FIG. 9. In contrast and should the top 2 in the embodiments of FIGS. 2–4 lose all or even some of its residual tension, it is possible that the locking arrangement of FIGS. 3 and 4 may disengage and the flanges 4 and 4' move completely out of their retaining channels 6 and 6'.

FIG. 10 illustrates a similar modification to the embodiment of FIG. 4 to provide an interference fit between the protuberance 15' on the flange 5' and the legs 7' and 9' of the channel 11'. In one design of FIG. 10, the channel forming member 13' is made of relatively rigid material and only the flange 5' is made of resilient, flexible material and flexes. However, as in the embodiment of FIGS. 5–9, either or both of the flange 5' and the channel forming member 13' could flex to allow the flange 5' to pass by the interference fit to the engaged position of FIG. 10. The protuberance 15' in FIG. 10 is also substantially at the terminus of the flange 5' as opposed to being substantially in the middle between the axially spaced end positions 21 and 25 of the flange 5 in FIGS. 5–9.

Third Approach of FIGS. 11–21

The embodiments of FIGS. 11–14, 15–17, and 18–21 like of the second approach of FIGS. 5–10 provide an initial interference fit between the flange and U-shaped channel and do not rely on any residual tension in the top 2 to keep the flange and channel member attached. However, unlike the designs of FIGS. 5–10, the arrangements of FIGS. 11–21 provide structure wherein the belts or flanges 30, 30', and 30" will not only stay attached if all residual tension is removed from the top 2 but also will stay attached in their mating, locked positions under such conditions.

Referring first to the embodiment of FIGS. 11–14, the belt or flange 30 like flanges 5 and 5' of FIGS. 5–7 has a flattened or elongated width with first and second end portions 32 and 34 spaced from each other along a first axis 36. Similarly, the end or edge portion 8 of the top 2 is wrapped around the first end portion 32 and attached thereto by a sew line at 12 through the fabric top 2 and flange 30. The U-shaped channel 38 in FIG. 11 is then formed by channel member 40. Member 40 is shown as an h-shaped member similar to 6' in FIG. 4 but the U-shaped channel for all of the embodiments of this invention could be made or molded directly into the vehicle body 1 or formed by a member like 6 in FIG. 2 that uses the vehicle body 1 as one of the legs of the U-shape. The intent in each case is to make the U-shaped channel essentially an integral part of the vehicle body 1. The roles of the flange and channel could be reversed if desired with the flange mounted on the vehicle body and the channel on the top but the illustrated versions with the channel formed on the vehicle body are preferred.

In the embodiment of FIGS. 11–14, the second end portion 34 of the flange 30 is first inserted manually into the U-shaped channel 38 to the first position of FIG. 11. At this position, there is an interference fit between the flange 30 and the legs 42 and 44 of the U-shaped channel 38. This occurs because the height or effective thickness 46 of the flange 30 at bump 48 in FIG. 11 is greater than the spacing 50 between the legs 42 and 44 of the U-shaped channel 38. Consequently, as the flange 30 is inserted farther into the U-shaped channel 38 to the second position of FIG. 12, one or both of the flange 30 and channel member 40 must flex to allow this to occur. In the embodiment of FIGS. 11–14, the channel member 40 is preferably made of relatively rigid material (e.g., metal) and does not flex and the flange 30 is preferably made of resilient, flexible material (e.g., polypropylene) and does the flexing.

In the second position of FIG. 12, there is essentially a three point application of opposing forces F at bumps 48 and 52 and the protuberance 54. This causes the second end portion 34 of the flange 30 to flex or sway as shown in FIG. 12 with the protuberance 54 spaced from attachment or engagement with the recess 56. At this point, the second end portion 34 of the flange 30 is in a cocked or loaded state which is then released as the flange 30 is moved past the second position of FIG. 12. Upon such release, the flexed second end portion 34 of the flange 30 is rotated relative to the U-shaped channel 38, to drive the protuberance into the third position of FIG. 13. In this third position of FIG. 13, the protuberance 54 attaches and mates in the recess 56 to lock the flange 30 in the channel member 40. The protuberance 54 as illustrated is substantially at the terminus of the second end portion 34 of the flange 30 and extends outwardly of the first axis 36. Additionally, the flexible flange 30 is shown to assume a first, unflexed shape in the first position of FIG. 11 and then a second, different or flexed shape in FIG. 12. Upon reaching the third, locked position of FIG. 13, the flange 30 again substantially assumes the first shape of FIG. 11. It is also noted that as the flange 30 is inserted into the U-shaped channel 38 from the first position of FIG. 11 to the second position of FIG. 12, the interference fit continues to apply force to continually flex the second end portion 34 of the flange 30. Further, this continually applied force continually increases as the flange 30 is moved from the first position of FIG. 11 to the second, cocked position of FIG. 12.

Once this force is released as the flange 30 is manually moved beyond the second position of FIG. 12, the protuberance 54 and recess 56 will then attach and mate in the position of FIG. 13. To assist this movement, the surface 58 partially defining the recess 56 (see FIG. 14) and the surface 60 of the protuberance 54 are preferably inclined to one another. This essentially creates a ramping or wedging effect to assist the insertion of the protuberance 54 into the recess 56. More importantly and when at least one of the surfaces 58 and 60 is at an angle 62 greater than 90° to the axis 36 in FIG. 14, it will assist in the disengagement and withdrawal of the protuberance 54 from the recess 56. That is, to cause the protuberance 54 to disengage from the locked position of FIG. 13, a withdrawal force is manually applied to the flange 30. This withdrawal force preferably has at least a component applied substantially along the axis 36 in a direction from the second end portion 34 of the flange 30 to the first end portion 32 thereof. Upon the application of such a withdrawal force, the inclined, abutting surfaces 58 and 60 will create a ramp effect lifting the protuberance 54 out of the recess 56 (see the dotted lines in FIG. 14) to the second position of FIG. 12.

Any downward component of the withdrawal force on the first end portion 32 of the flange 30 in a direction perpendicular to the axis 36 will also assist this disengagement and lifting. In this regard, any such downwardly applied force will slightly flex or sway the end portion 34. This will then facilitate the withdrawal by accentuating the angle between the inclined surfaces 58 and 60. In this manner, the flange 30 for the most part can be manually removed when desired from locked engagement with the U-shaped channel 38 by simply reversing the insertion steps of FIGS. 11–13.

It is also noted that depending on the flexibility of the second end portion 34 of the flange 30, it may not even be necessary to so incline the surfaces 58 and 60 to each other and/or the axis 36 in the locked position of FIG. 13. More specifically, the surfaces 58 and 60 may even be flush with each other in FIG. 13 and perpendicular to the axis 36. The downward force component on the first end portion 32 may then rock or pivot the flange 30 about bump 52 enough to flex or sway the second end portion 34 to the dotted position of FIG. 14. This would then create the desirable angle or incline between the surfaces 58 and 60 to assist disengagement.

Figure 15:
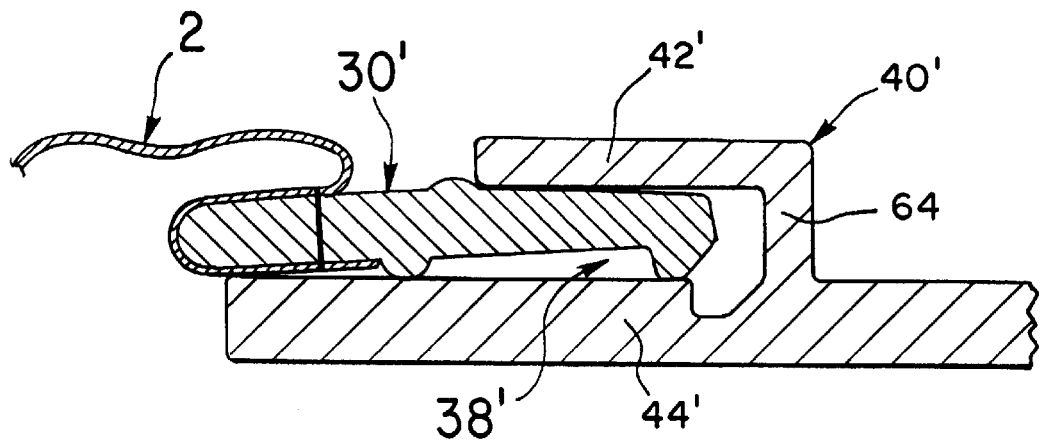
Figure 16:
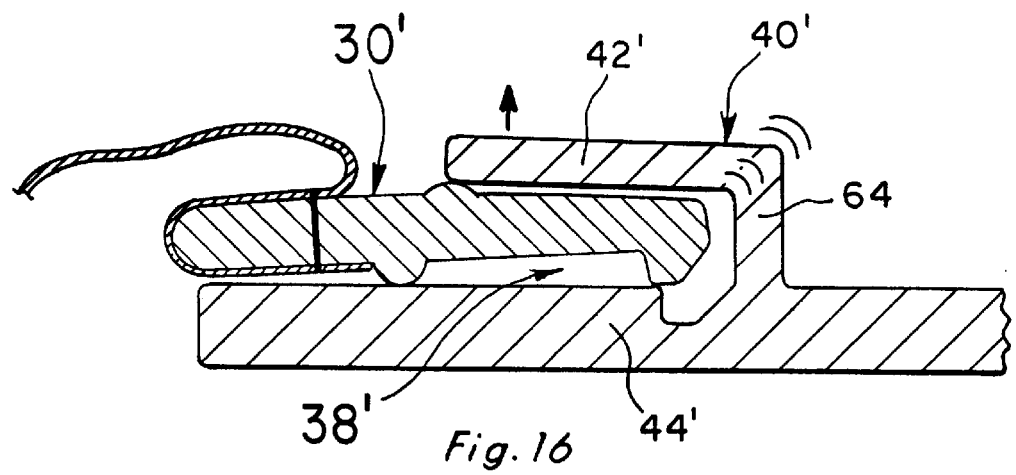
Figure 17:
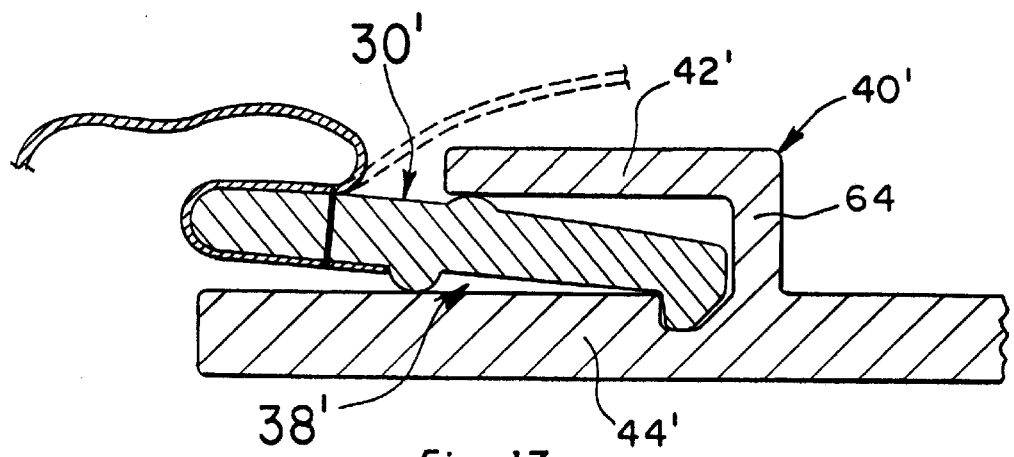

FIGS. 15–17 illustrate another embodiment in which the flange 30' is made of relatively rigid material and preferably does not flex. Additionally, at least the leg 42' and/or base 64 of the U-shaped channel member 40' extending between legs 42' and 44' is preferably made of the resilient, flexible material and does the flexing. Otherwise, the operation of the embodiment of FIGS. 15–17 is essentially the same as that of FIGS. 11–14.

Figure 18:
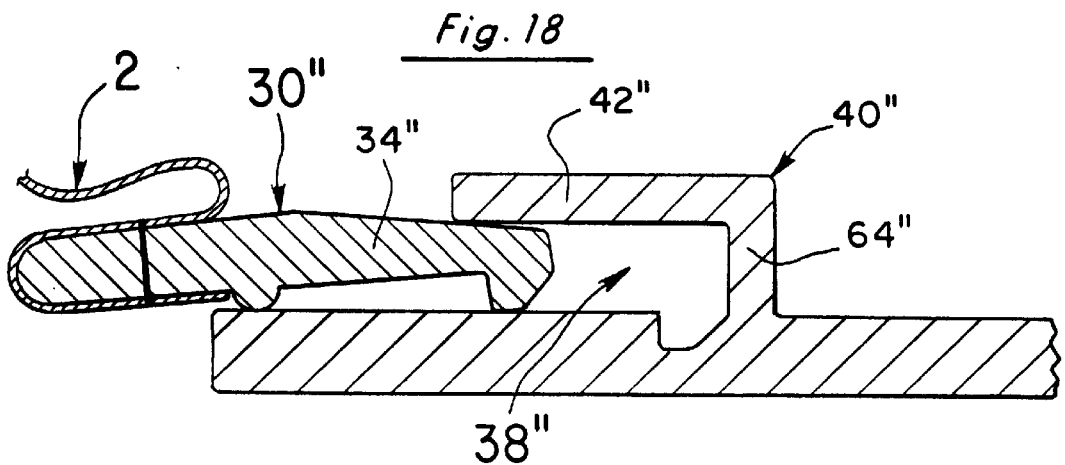
Figure 19:
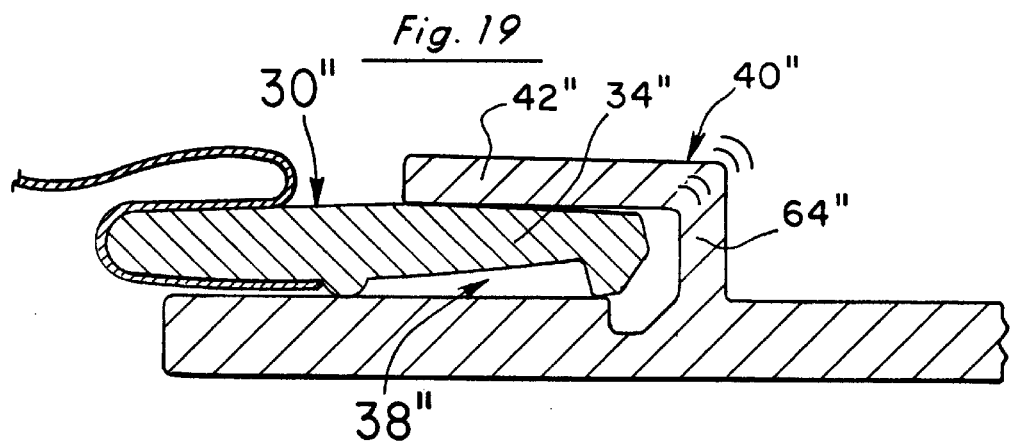
Figure 20:
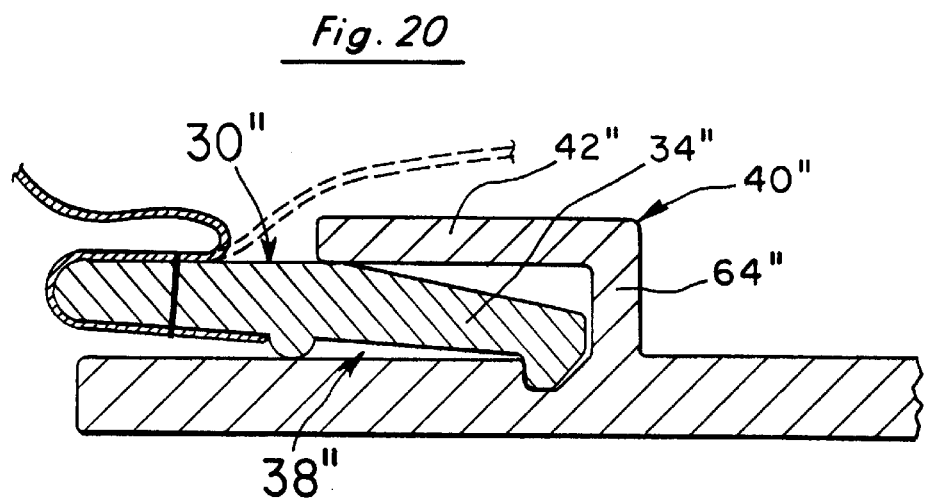

Similarly, the embodiment of FIGS. 18–20 is substantially the same as those of FIGS. 11–14 and 15–17 except that both the flange 30" at its second end portion 34" and the U-shaped channel member 40n are made of resilient, flexible material and flex as the flange 30" is inserted into the U-shaped channel 38".

Figure 21:
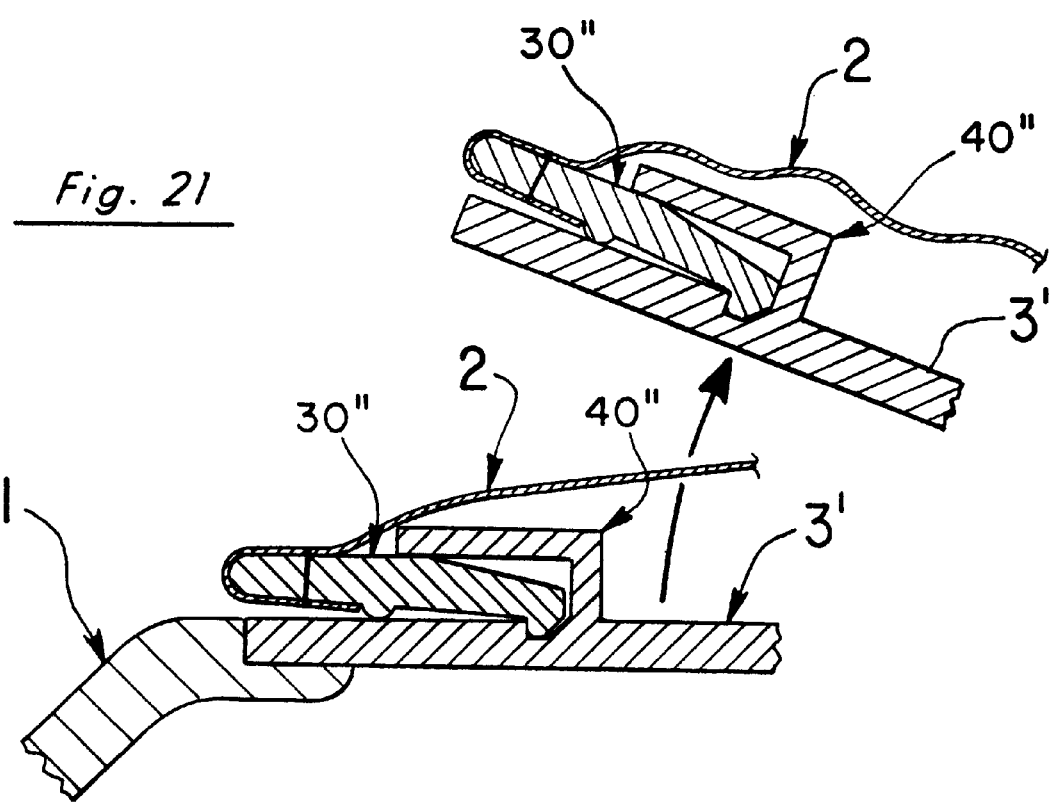

FIG. 21 is a view taken along line 21—21 of FIG. 1 and illustrates the fundamental advantage of all of the designs of FIGS. 5–20. That is, the flange (30" in the case of FIG. 21) will stay in the channel member (40") regardless of whether there is any residual tension applied to the flange by the top 2. As discussed above, heated or aged tops 2 may simply lose such tension. Also, as illustrated in FIGS. 1 and 21, it is becoming increasingly popular to have bow or supporting structure such as 3' in FIGS. 1 and 21 that pivots or folds back on itself. This pivoting or folding can be either completely or only partially as in FIG. 1 to form an opening over the passenger cockpit of the vehicle 1. Whether the bow structure of the vehicle body 1 and flexible top 2 are folded completely back on themselves for storage or only partially so, it will almost always release any tension in the flexible top 2. However, with any of the designs of FIGS. 5–21, the flange will still be maintained in the channel and the top 2 will thus remain attached to the portion of the vehicle body 1 where the channel is mounted.

Fourth Approach of FIGS. 22–34

The fourth approach of FIGS. 22–34, like the first approach of FIGS. 2–4, employs a noninterference fit between the channel member and the flange. However, unlike the designs of FIGS. 2–4, the non-interference one of FIGS. 22–34 has been adapted to be self-locking. Consequently, even when there is no tension on the flange from the flexible top, the flange and channel member will still stay engaged in a locking position with each other.

In FIG. 22, this fourth approach is illustrated in use to removably attach the rear area 4 of the flexible top 2' to the vehicle roof portion 5 extending between the B-pillars 7. The channel member 70 and flange 72 of the fourth approach are individually shown in FIGS. 23–26. FIGS. 23 and 24 in this regard are respective top plan views of the channel member 70 and flange 72. FIGS. 25 and 26 then show these elements as viewed respectively along lines 25—25 and 26—26 of FIGS. 23 and 24. As illustrated in FIG. 25, the substantially rigid, channel member 70 (e.g., aluminum) has a normally curved or arched shape along its length. In contrast, the shape of the flange 72 (relatively stiff, extruded propylene) is normally straight and flat as illustrated in FIG. 26. The curved shape of the channel member 70 essentially matches the shape of the vehicle roof portion 5 extending between the B-pillars 7 (see FIG. 27 which is taken along line 27—27 of FIG. 22). With the curved channel member 70 mounted on the curved, vehicle roof portion 5 as shown in FIG. 27, the normally flat and straight flange 72 of FIG. 26 must then be manually arched or flexed along its length to be received into the curved channel member 70.

More specifically and referring to FIGS. 28–31, the rear area 4 of the flexible top or sunroof 2' is attached (e.g., sewn at 74) to the one end portion 76 of the flange 72. With the top 2' pivoted up as in FIG. 22, the rear area 4 of the top 2' is loose and untensioned. To then initially place the flange 72 into the channel member 70, the flange 72 of FIG. 28 can be manually inserted into the channel member 70. In doing so, the end portion 78 of the flange 72 and the tooth or protuberance 80 are passed between the spaced-apart, leg portions 82 and 84 of the channel member 70. The end portions 76 and 78 of the flange 72 in this regard are spaced apart from each other along the width of the flange 72 (see FIG. 28). Additionally, the protuberance 80 extends outwardly and away from the end portion 78 of the flange 72 in a substantially perpendicular direction.

As indicated above, the fit of this fourth approach is a non-interference one in that the maximum or combined thickness of the end portion 78 and the protuberance 80 is less than the distance between the spaced-apart, leg portions 82 and 84. Consequently, in the cross section of FIG. 28, the flange 72 and protuberance 80 can be easily slid between the leg portions 82 and 84 of the channel member 70. Were the channel member 70 flat along its length, the flange 72 and protuberance 80 could then be easily removed or even fall out of the channel member 70 unless tension were maintained on the flexible top 2' (as needed in the previously mentioned, non-interference designs of FIGS. 2–4). However, in this fourth approach, the channel member 70 has been curved along its length (see FIG. 25). Consequently, as the flange 72 is inserted into the channel member 70 to the first position of FIGS. 27 and 29–31, the normally flat and straight, extruded flange 72 of FIG. 26 must be flexed and curved along its length to be received into the curved, channel member 70. In doing so, the flexible but resilient flange 72 (e.g., relatively stiff, extruded polypropylene) resists such flexing or bending.

The result is that the flange 72 will try to straighten itself and will end up abutting the outer leg portion 82 of the channel member 70 at the first and second locations 90 and 92 in FIG. 27. This generates a central force F on the middle 94 of the flange 72 in FIG. 27 between the first and second, abutting locations 90 and 92. This force F then biases and moves the middle 94 of the flange 72 away from the outer leg portion 82 of the channel member 70. As explained in more detail below, this movement in turn at least partially seats and locks the protuberance 80 at the middle location 94 into the mating recess 88 in the opposite leg portion 84 of the channel member 70. This action is best seen by reference to the cross sections of FIGS. 29–31.

FIGS. 29–31 are cross sections taken respectively along lines 29—29, 30—30, and 31—31 of FIG. 27. In the cross sections of FIGS. 29 and 31, the flange 72 is shown at the first and second locations 90 and 92 of FIG. 27 in which the flange 72 abuts the outer leg portion 82 of the channel member 70. As illustrated in FIGS. 29 and 31, the protuberance 80 at these first and second locations 90 and 92 is spaced and disengaged from the recess 88. In contrast, at the middle location 94 in FIG. 27 between these abutting locations 90 and 92, the flange 72 (see FIG. 30) is moved and biased downwardly (in the orientation of FIG. 30) to at least partially engage and mate the protuberance 80 into the recess 88. At this point and even with no tension on the top 2', the flange 72 will still be locked in the channel member 70. The top or sunroof 2' of FIG. 22 can then be fully opened or pivoted rearwardly without fear that the flange 72 and attached rear area 4 of the top 2' will become disengaged from the channel member 70. As indicated above, the flexing action of the flange 72 as illustrated in FIGS. 27 and 29–31 is essentially self-locking, even when there is no tension on the top 2'. The flange 72 and attached top 2' will then stay engaged in the channel member 70 whether or not there is any tension on the top 2' and regardless of the position of the top 2' (e.g., closed, opened, or in between).

As mentioned above, the resiliency of the flange 72 (which causes the flange 72 to flex outwardly and abut the curved, outer leg portions 82 of the channel member 70 at the first and second locations 90 and 92 in FIG. 27) will actually serve to space and disengage the protuberance 80 from the recess 88 at the locations 90 and 92. This is illustrated in the cross sections of FIGS. 29 and 31 in which the protuberance 80 and recess 88 are still aligned with each other but are spaced and not mated or engaged with each other. The self-locking nature of the embodiment of FIGS. 22–34 is then due to the action of the flexed, resilient flange 72 biasing the middle 94 of the flange 72 downwardly (in the orientation of FIGS. 27 and 30) away from the outer, channel leg portion 82. This action as also discussed above is caused by the resilient, flexed flange 72 trying to straighten itself within the curved channel member 70. In doing so, the protuberance 80 along the middle 94 of the flange 72 (see FIG. 30) is then moved downwardly in the orientation of FIG. 30 by the force F to at least partially mate the protuberance 80 in the recess 88. This occurs regardless of whether there is any tension on the flexible top 2'.

It is further noted at this point that when the flexible top 2' of FIG. 22 is actually pivoted forwardly to its closed position, the top 2' will provide additional forces on the flange 72 in the direction of arrow 96 in FIG. 32. These additional forces will tend to pivot the flange 72 about the channel member 70 to fully seat and lock the protuberance 80 into the mating recess 88 as in FIG. 32. However, the degree of seating or mating tends to be more (see FIG. 32) at the middle location 94 between the abutting locations 90 and 92 of FIG. 27. The seating is then progressively less moving outwardly from the middle location 94 to the normally unseated positions at the abutting locations 90 and 92 (see FIGS. 29 and 31).

The flexing action of the flange 72 is further enhanced in the preferred embodiment by providing smaller radius sections 98 on each end of the channel member 70. These end sections 98 (see FIG. 27) are respectively outwardly beyond the first and second abutting locations 90 and 92. The operation of the flange 72 in the channel member 70 in these end sections 98 is essentially the same as in the area between abutting locations 90 and 92 of FIG. 27. For example, the flange 72 in the left, end section 98 (see the enlarged view of FIG. 33) abuts the outer leg portion 82' of the channel member 70 at locations 100 and 90. The action in the intermediate location between the abutting locations 100 and 90 in FIG. 33 is then essentially the same as between abutting locations 90 and 92 in FIGS. 27. That is, the flange 72 in the end section 98 will be flexed to abut the outer leg portion 82' of the channel member 70 at locations 100 and 90. Between these abutting locations 100 and 90, the intermediate area of the flange 72 will then be biased away from the outer leg portion 82' of the channel member 70. This similarity of operation between locations 90 and 92 and between locations 100 and 90 is further illustrated in FIG. 33 by showing that the cross sections along lines 29—29, 30—30, and 31—31 of FIG. 33 would essentially be the same as the corresponding ones taken in FIG. 27.

FIG. 33 also serves to illustrate the resilient, flexing action of the flange 72 by reference to the radii of curvature R and r of the flange 72 and the outer leg portion 82' of the channel member 70. That is, the flexed flange 72 is actually trying to straighten itself in the end section 98 of channel member 70 and in doing so assumes a flatter shape (larger radius of curvature R) than the curved leg portion 82' (which has a smaller radius of curvature r). This is correspondingly true for the area between abutting locations 90 and 92 of FIG. 27 in that the radius of curvature R' of the flange 72 (see FIG. 34) is actually larger that the radius of curvature r' of the curved leg portion 82' of the channel member 70. Referring again to FIG. 33, the flange 72 in this general regard could actually be flat (or even inverted) if desired between the abutting locations 100 and 90 in FIG. 33.

The end sections 98 in FIGS. 27 and 33 as indicated above help to enhance the operation of the flange 70 and channel member 72 by causing the flange 70 to be severely flexed in the smaller radius curves of the end sections 98. This helps to more firmly press or abut the flange 72 against the channel member 70 at the first and second locations 90 and 92. The third and fourth abutting locations 100 on each end section 98 are thus preferred. In the end sections 98 as is true along the entire length of the channel member 70, the opposing leg portions 82 and 84 of the channel member 70 are preferably aligned with each. However, the shapes of these leg portions could vary as could the spacing therebetween as long as the self-locking action of this fourth approach was maintained. The channel member 70 as illustrated (see FIG. 28) is also preferably U-shaped as in the other approaches with a base portion 83 extending between the two, spaced-apart leg portions 82 and 84.

While several embodiments of the present invention have been shown and described in detail, it is to be understood that various changes and modifications could be made without departing from the scope of the invention.

We claim:

1. A retaining arrangement primarily intended for removably attaching a flexible top to a vehicle body, said retaining arrangement including:

a channel member formed adjacent said vehicle body, said channel member having two, spaced-apart leg portions, a flange with an elongated width having first and second end portions spaced from each other in a first direction, said flexible top being attached to said flange and said second end portion of said flange being receivable in said channel member between the spaced-apart leg portions thereof, said flange in being removably lockable said channel member by a locking arrangement, said locking arrangement including a mating protuberance and recess, said protuberance extending along the length of said flange and outwardly of said flange in a second direction away from said first direction, said mating recess extending along the length of said channel member and inwardly of one of the leg portions of said channel member, said leg portions of said channel member being spaced apart a first distance and the flange and protuberance together having a combined thickness in said second direction less than said first distance wherein said flange and protuberance can be inserted into said channel member between the space-apart leg portions thereof to a first position with the protuberance and recess aligned, at least the other of said two, spaced-apart leg portions of said channel member being substantially curved along the length thereof between first and second locations, said flange being flexible and resilient and abutting said other leg portion at said first and second locations when said flange is inserted into said channel member to said first position to bias said flange at a middle location between said first and second abutting locations away from said other leg portion and toward the one leg portion to at least partially mate said protuberance in a locking position in said recess at said middle location.

2. The retaining arrangement of claim 1 wherein the flexible, resilient flange in said first position biases the protuberance at said first and second abutting locations away from mating in the recess in the one leg portion of the channel member.

3. The retaining arrangement of claim 1 wherein said channel member is substantially U-shaped with a base portion extending between said leg portions.

4. The retaining arrangement of claim 3 wherein the recess in said one leg portion is adjacent said base portion.

5. The retaining arrangement of claim 1 wherein said channel member is made of relatively rigid material.

6. The retaining arrangement of claim 1 wherein the top is attached to said flange adjacent the first end portion thereof.

7. The retaining arrangement of claim 1 wherein said protuberance is on the second end portion of the flange.

8. The retaining arrangement of claim 1 wherein the flange in said first position is flexed into a curve between said first and second abutting locations.

9. The retaining arrangement of claim 1 wherein the other leg portion of the channel member has a first radius of curvature between said first and second locations, said flange has a second radius of curvature between said first and second abutting locations, and said first radius is smaller than the second radius.

10. The retaining arrangement of claim 1 wherein both of said leg portions of the channel member are curved along the length of the channel member.

11. The retaining arrangement of claim 1 wherein said other leg portion of the channel member is further curved along the length of the channel member beyond at least one of said first and second locations to a third location wherein said flange abuts said other leg portion at said third location to bias said flange at an intermediate location between said third location and the one of said first and second locations away from said other leg portion and toward the one leg portion to at least partially mate the protuberance in a locking position in said recess at said intermediate location.

12. The retaining arrangement of claim 11 wherein the other leg portion of the channel member has a first radius of curvature between said third location and the one of said first and second locations, said flange has a second radius of curvature between said third location and said one of said first and second abutting locations, and said first radius is smaller than the second radius.

13. The retaining arrangement of claim 11 wherein the radius of curvature of the other leg portion between the third location and the one of said first and second locations is less than the radius of curvature of the other leg portion between said first and second locations.

* * * * *

UNITED STATES PATENT AND TRADEMARK OFFICE
CERTIFICATE OF CORRECTION

PATENT NO.   : 6,241,305 B1
DATED        : June 5, 2001
INVENTOR(S)  : Rick H. Troeger It is certified that error appears in the above-identified patent and that said Letters Patent is hereby corrected as shown below:

<u>Title page,</u>
Item [75], Inventor should read -- Rick H. Troeger is the sole inventor --.

<u>Column 10,</u>
Line 42, is corrected to read:
-- said flange being removably lockable in said channel --.

Signed and Sealed this

Second Day of July, 2002

*Attest:*

*Attesting Officer*

JAMES E. ROGAN
*Director of the United States Patent and Trademark Office*